United States Patent
Fischer

(10) Patent No.: US 9,615,391 B2
(45) Date of Patent: Apr. 4, 2017

(54) SYSTEMS AND METHODS OF GESTURE-BASED DETECTION OF DRIVER MOBILE DEVICE

(71) Applicant: Ford Global Technologies, LLC, Dearborn, MI (US)

(72) Inventor: Joel J. Fischer, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 14/184,181

(22) Filed: Feb. 19, 2014

(65) Prior Publication Data

US 2015/0237662 A1    Aug. 20, 2015

(51) Int. Cl.
| | |
|---|---|
| H04B 7/00 | (2006.01) |
| H04W 76/02 | (2009.01) |
| G06F 3/0488 | (2013.01) |
| H04L 29/08 | (2006.01) |
| H04M 1/60 | (2006.01) |
| H04W 4/00 | (2009.01) |
| B60K 37/00 | (2006.01) |
| H04M 1/725 | (2006.01) |

(52) U.S. Cl.
CPC ......... *H04W 76/023* (2013.01); *B60K 37/00* (2013.01); *G06F 3/04883* (2013.01); *H04L 67/125* (2013.01); *H04M 1/6075* (2013.01); *H04W 4/008* (2013.01); *H04M 1/7253* (2013.01)

(58) Field of Classification Search
CPC ......... H04M 2250/12; H04M 1/7253; H04M 2250/22; H04M 1/72544; H04M 1/72577; H04M 2250/02; H04M 1/66; H04M 2250/52; H04M 1/6066; H04M 1/0202; G06F 3/017; G06F 3/04883; G06F 3/0346; G06F 1/1694; G06F 3/0304; G06F 1/1686; G06F 3/011; G06F 1/1643; G06F 1/3231; G06F 2200/1637; H04W 4/008; H04W 12/06; H04W 52/0254; H04W 4/206; H04W 4/023; H04W 52/0267

See application file for complete search history.

(56) References Cited

U.S. PATENT DOCUMENTS

| | | | |
|---|---|---|---|
| 8,457,692 B2 | 6/2013 | Fyke et al. | |
| 8,461,973 B2 | 6/2013 | Reed et al. | |
| 2005/0277445 A1* | 12/2005 | Bae | 455/569.1 |
| 2010/0199092 A1* | 8/2010 | Andrus et al. | 713/171 |
| 2012/0161927 A1* | 6/2012 | Pierfelice | H04L 63/10 340/5.83 |
| 2013/0065517 A1* | 3/2013 | Svensson et al. | 455/39 |
| 2013/0150004 A1 | 6/2013 | Rosen | |
| 2013/0273866 A1 | 10/2013 | Catten et al. | |
| 2014/0181691 A1* | 6/2014 | Poornachandran | H04W 4/008 715/753 |
| 2014/0194056 A1* | 7/2014 | Barrett | H04M 1/6091 455/41.1 |
| 2015/0031288 A1* | 1/2015 | Tubbesing et al. | 455/41.1 |

* cited by examiner

*Primary Examiner* — Golam Sorowar
(74) *Attorney, Agent, or Firm* — Jennifer M. Stec; Brooks Kushman P.C.

(57) ABSTRACT

A vehicle may be configured to prompt for a gesture-based identifying action, the action to be performed via moving a device, thereby identifying the device for association as the driver device; identify movement of the device in accordance with the gesture-based identifying action; and associate the device, moved in accordance with the gesture-based identifying action, as the driver device.

18 Claims, 6 Drawing Sheets

SYSTEMS AND METHODS OF GESTURE-BASED DETECTION OF DRIVER MOBILE DEVICE

TECHNICAL FIELD

The present disclosure generally relates to vehicle infotainment systems, and more particularly, to systems and methods of gesture-based detection of which vehicle device is associated with the vehicle driver.

BACKGROUND

When a driver enters a vehicle with a device recognized by the vehicle, the vehicle may automatically pair with the device. Once paired, the device may have access to computing facilities of the vehicle. For safety purposes, if a device is associated with the driver, then that device may have certain functions locked out when the vehicle is in motion.

SUMMARY

In a first illustrative embodiment, a system for identifying a driver device includes at least one controller configured to prompt for a gesture-based identifying action, the action to be performed via moving a device, thereby identifying the device for association as the driver device; identify movement of the device in accordance with the gesture-based identifying action; and associate the device, moved in accordance with the gesture-based identifying action, as the driver device.

In a second illustrative embodiment, a computer-implemented method for identifying a driver device including prompting for a gesture-based identifying action, the action to be performed via moving a device, thereby identifying the device for association as the driver device; identifying movement of the device in accordance with the gesture-based identifying action; and associating the device, moved in accordance with the gesture-based identifying action, as the driver device.

In a third illustrative embodiment, a non-transitory computer-readable medium includes instructions for identifying a driver device configured to cause at least one controller to prompt for a gesture-based identifying action, the action to be performed via moving a device, thereby identifying the device for association as the driver device; identify movement of the device in accordance with the gesture-based identifying action; and associate the device, moved in accordance with the gesture-based identifying action, as the driver device.

DETAILED DESCRIPTION

Figure 1:
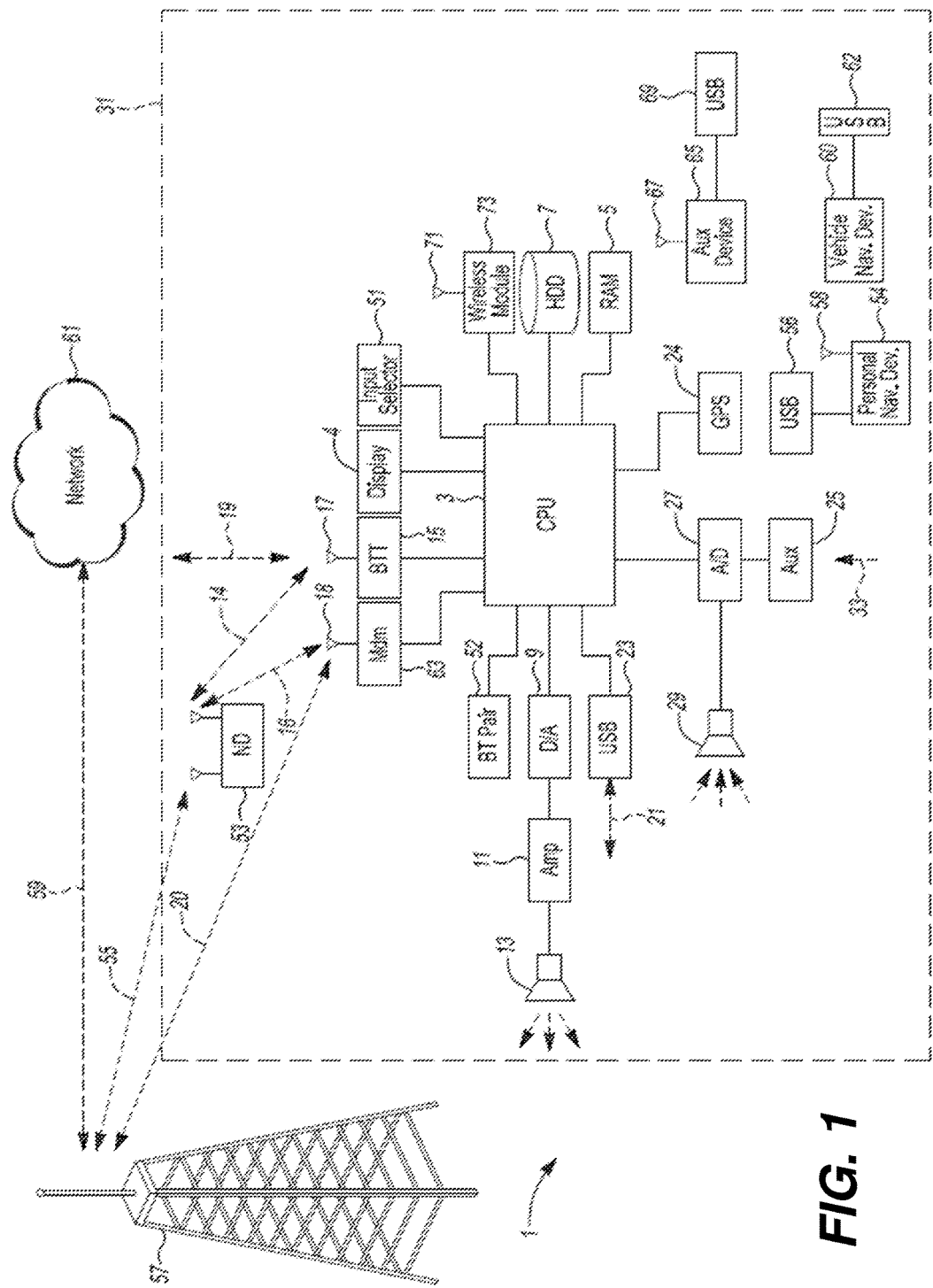
FIG. 1 is an exemplary block topology of a vehicle infotainment system implementing a user-interactive vehicle based computing system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Upon identifying a driver's nomadic device within the vehicle, a vehicle based computing system (VCS) may be configured to perform various actions, such as loading user preferences corresponding to a user of the identified nomadic device and locking out input devices of the identified nomadic device. However, when multiple users carrying nomadic devices enter a vehicle, it may be difficult for the VCS to determine which nomadic device is the driver's device, and which device or devices belong to the passengers. For example, a husband and wife may both enter a vehicle, and both may be carrying devices that have been previously paired with the vehicle. Thus, the VCS may be unable to assume which device belongs to the driver. Moreover, it may be difficult for the VCS to determine whether a passenger and the driver have switched nomadic devices while in the vehicle, and whether the association of a device as being the driver nomadic devices should be changed based on the switch.

Upon detecting that there are multiple possible nomadic devices to choose from within the vehicle, the VCS may request that a gesture-based identifying action be performed to one of the nomadic devices, to allow the VCS to identify which device should be designated as the driver device. As one example, the VCS may be configured to request movement of the nomadic device to be selected to close proximity to a designated location within the vehicle (such as in front of a head unit display, in front of the steering wheel, on the vehicle center console, in a vehicle cup holder, on the top or front dash area, etc.). To allow the driver to select his device, the designated location may be chosen to be a location within reach of the driver or driver seat. The action may accordingly be interpreted by the vehicle as an indication that the moved nomadic device is the device to be selected for association with the VCS as the driver device. Responsive to the action, the VCS may be configured to associate the identified device with the VCS (e.g., to load the proper user settings and lock associated device input devices). Thus, by way of receiving the gesture-based identifying actions, the VCS of the vehicle may be able to quickly and easily identify which nomadic device should be selected for association with the vehicle as the driver nomadic device. Moreover, if a vehicle occupant wishes to change which nomadic device is selected as being the associated device, the occupant may perform a gesture-based identifying action using the other device, causing the VCS to remove the old association and associate with that other nomadic device.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
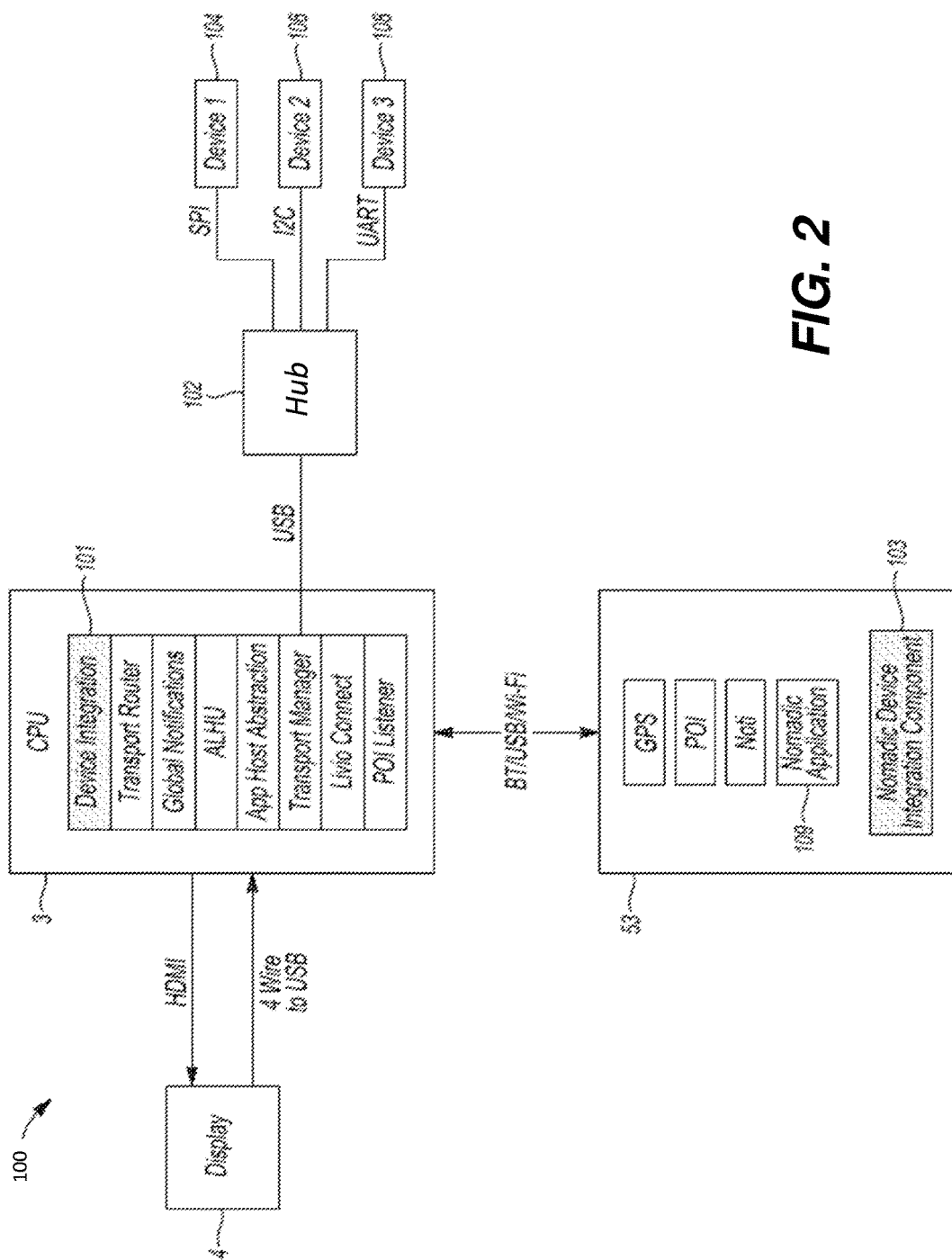
FIG. 2 is an exemplary block topology of an example system for integrating one or more nomadic devices with the vehicle based computing system.

FIG. 2 is an exemplary block topology of a system 100 for integrating one or more connected devices with the vehicle based computing system 1 (VCS). To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 to take advantage of the services provided by the device integration framework 101. Applications executed by the nomadic device 53 may accordingly utilize the device integration client component 103 to interact with the CPU 3 via the device integration framework 101. As one example, a music player application on the nomadic device 53 may interact with the CPU 3 to provide streaming music through the speaker 13 or stereo system output of the VCS 1. As another example, a navigation application on the nomadic device 53 may interact with the CPU 3 to provide turn-by-turn directions for display on the screen 4 of the VCS 1.

The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (12C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

Figure 3:
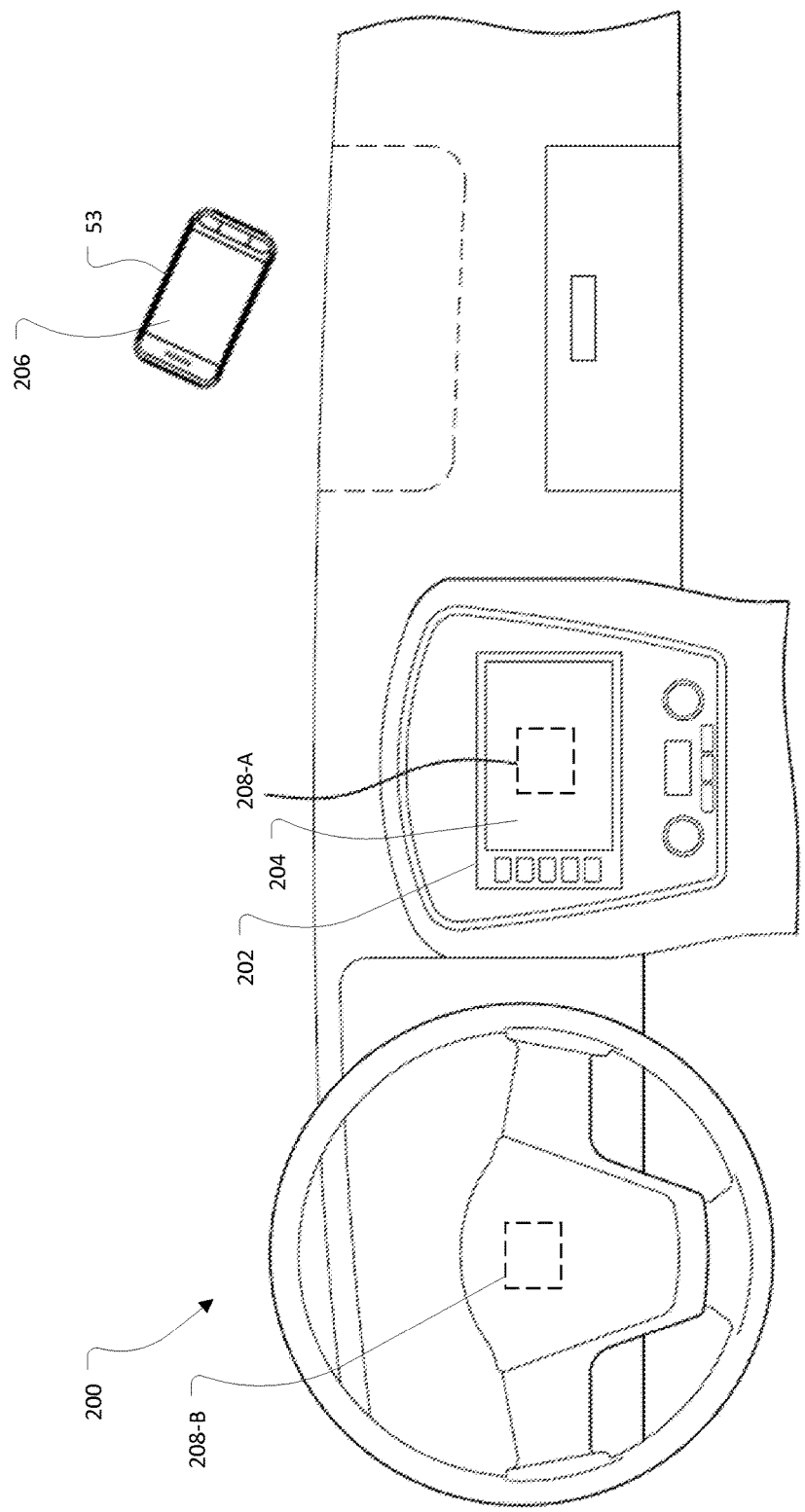
FIG. 3 is an illustrative example of a portion of a vehicle configured for identification of driver nomadic devices with the vehicle based computing system.

FIG. 3 is an illustrative example of a portion of a vehicle configured for identification of driver nomadic devices 53 with the VCS 1. As illustrated, the vehicle include a head unit 202 mounted in a relatively centralized control area between the driver and front passenger seats and configured to include a display 204. It should be noted that this configuration is merely exemplary, and other vehicle or VCS 1 layouts may be utilized as well.

When a nomadic device 53 is paired with the VCS 1, the VCS 1 may be able to perform certain actions based on the recognition. These actions may include, for example, loading vehicle user preferences associated with the user of that nomadic device 53. The identified nomadic device 53 may also be provided with access to certain features of the VCS 1, such as to provide information on the display 204. Moreover, the nomadic device 53 associated with the VCS 1 as the driver device may have certain functions locked out when the vehicle is in motion. For example, input using a touch screen input device 206 of the nomadic device 53 may be disabled on the paired nomadic device 53. Other nomadic devices 53 within the vehicle may avoid function lockout, but may not be able to affect vehicle user preferences or access the features of the VCS 1.

Presence of nomadic devices 53 within the vehicle may be detected by the VCS 1 by using the BLUETOOTH transceiver 15, or some other sensor of the vehicle capable of detecting the presence of nomadic devices 53. The VCS 1 may further maintain a listing of previously associated nomadic devices 53, and may filter the list of detected nomadic devices 53 to include only those devices on the previously associated list. However, to identify a more localized presence of a nomadic device 53, the vehicle may include one or more device sensors 208 may be configured, for example, to detect near field communications (NFC) or BLUETOOTH low energy (BLE) communications from a nomadic device 53 placed in their near vicinity. These device sensors 208 may be located at various locations of the vehicle cabin within the reach of the vehicle occupants (e.g., within reach of the driver selecting his or her nomadic device 53), and may facilitate the detection of nomadic devices 53 placed within close proximity to those locations (e.g., on the order of approximately 0-0.2 meters). For instance, a device sensor 208-A may be located within or nearby a head unit of the VCS 1 in which the display 204 is located, and a device sensor 208-B may be located within or nearby a steering wheel of the vehicle. Other locations are possible for device sensors 208 as well, such as on the vehicle center console, in a vehicle cup holder, or on the top or front dash area, as some other examples.

If only a single nomadic device 53 is detected by the vehicle (e.g., using transceiver 15), and that nomadic device 53 has previously been associated with the VCS 1 as the driver device (e.g., as identified by inclusion on the VCS 1 listing of previously associated nomadic devices 53), then the VCS 1 may simply associate with the detected nomadic device 53. If no nomadic devices 53 are detected by the VCS 1, or if no detected nomadic devices 53 that have previously associated with the VCS 1 are identified, then the VCS 1 may determine to not associate with any nomadic devices 53. In such a situation, the VCS 1 may provide a prompt on the display 204 that no known nomadic devices 53 have been located, or a prompt inviting the user to associate a new nomadic device 53 with the vehicle. However, when the VCS 1 detects that multiple nomadic devices 53 that have previously been associated with the VCS 1 are within the vehicle, it may be difficult for the vehicle to determine which nomadic device 53 should be associated with the VCS 1 as the driver device.

For example, a husband and wife may both enter a family vehicle, and both may be carrying nomadic devices 53 that have previously been paired with the VCS 1. In such a situation, the VCS 1 may be configured to prompt the user to identify which of the nomadic devices 53 should be associated with the VCS 1.

Figure 4:
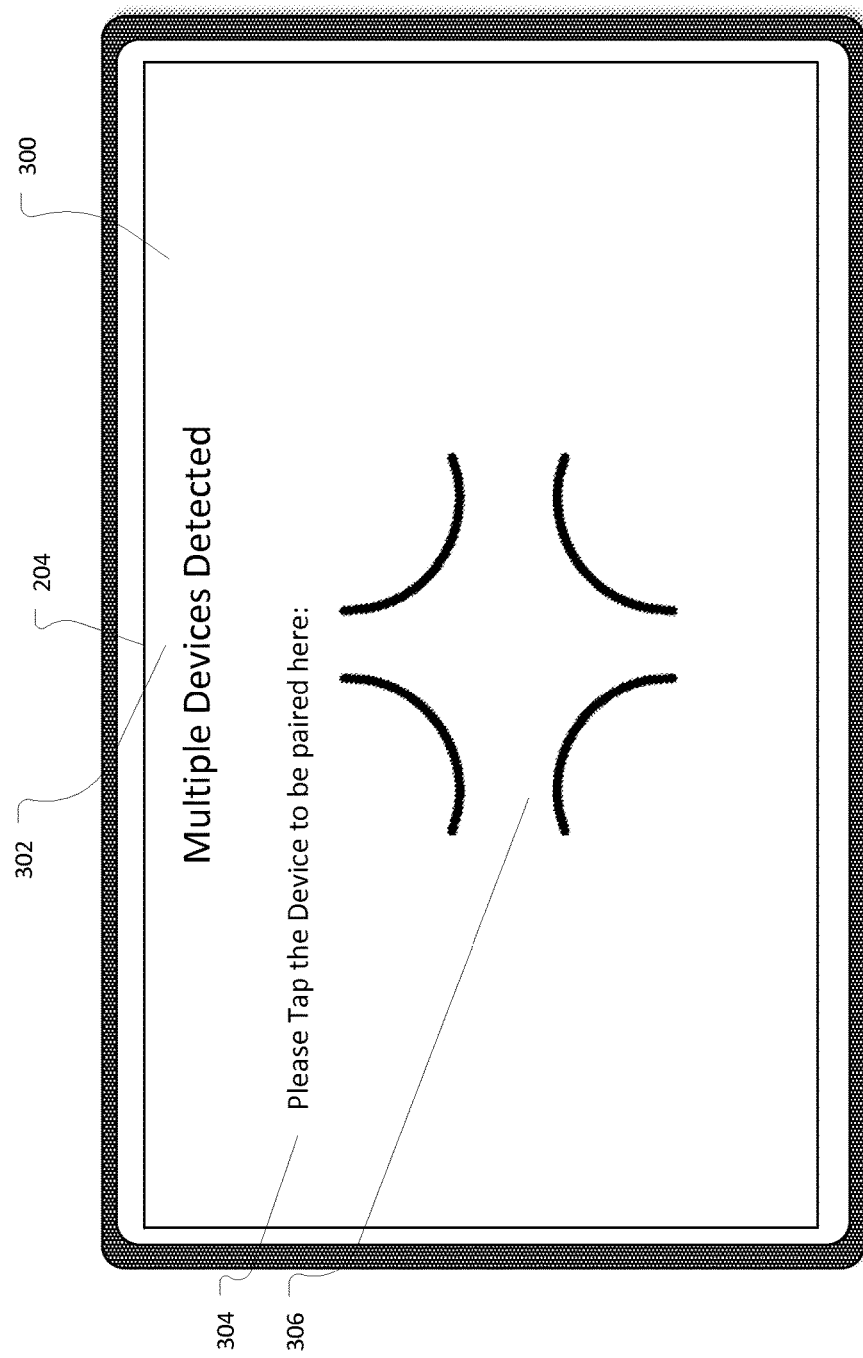
FIG. 4 illustrates an exemplary user interface of a vehicle based computing system displayed upon detection of multiple potential nomadic devices.

FIG. 4 illustrates an exemplary user interface 300 of a VCS 1 displayed upon VCS 1 detection of multiple potential nomadic devices 53. The user interface 300 may display an indication 302 that multiple devices 53 are detected, as well as instructions 304 requesting the user perform a gesture-based identifying action using the one of the multiple potential nomadic devices 53 to be selected for association with the VCS 1.

The gesture-based identifying action may include, for example, a request to tap place the nomadic device 53 to be paired at a designated location within the vehicle. The designated location may be a location within range of a device sensor 208 configured to detect the presence of nomadic devices 53. As one possibility, the user interface 300 may be displayed on a head unit of the VCS 1 incorporating device sensors 208, and the designated location may be specified by a graphical indication 306 on the user interface 300 itself. As another possibility, multiple designated locations may be specified by the instructions 304 (e.g., requesting that the driver tap the nomadic device 53 to be paired to either the steering wheel or the head unit).

Figure 5:
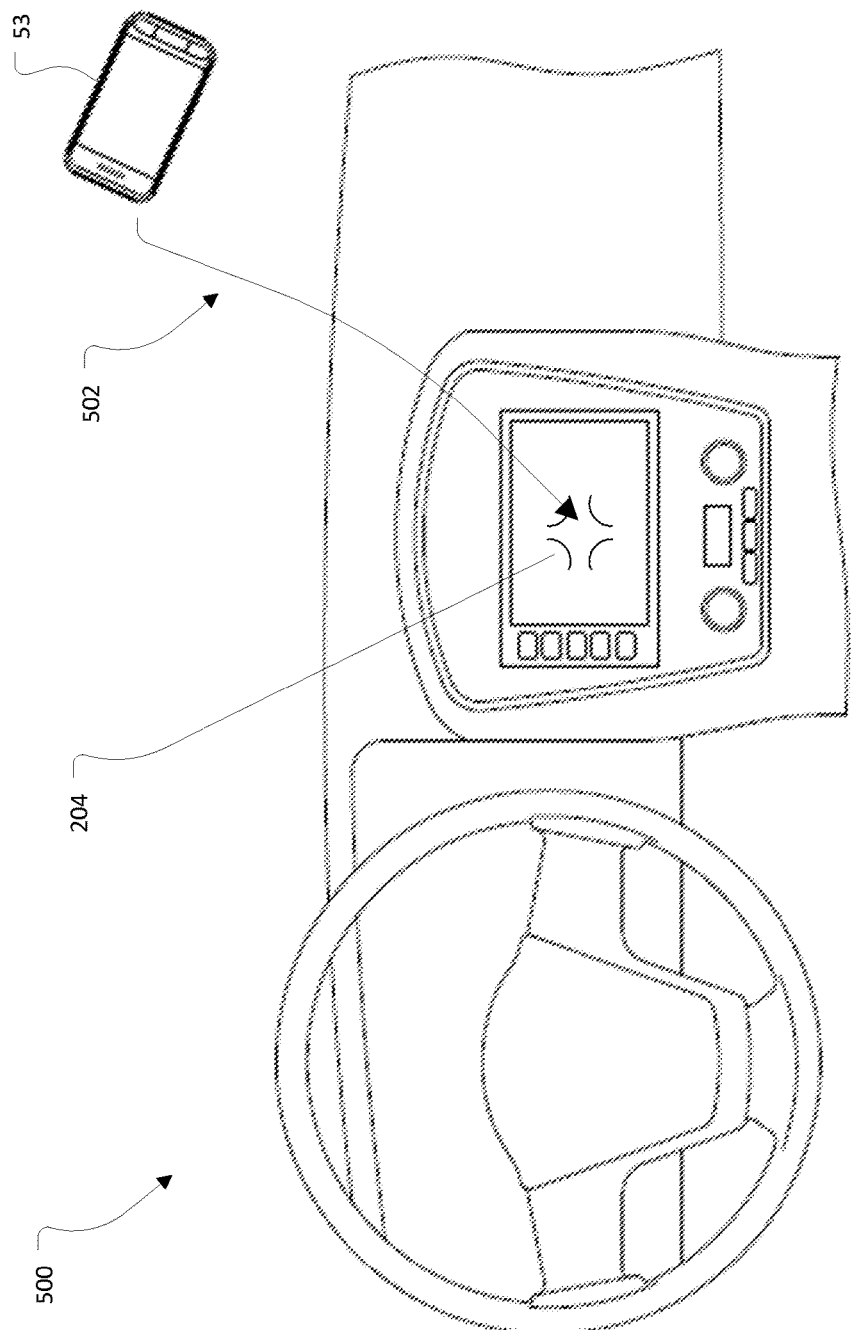
FIG. 5 illustrates an exemplary performance of a gesture-based identifying action using a nomadic device.

As shown in FIG. 5, the VCS 1 may be configured to detect when a selected nomadic device 53 is brought within close proximity to the device sensor 208-A of the display 204 (e.g., by gesture-based identifying action 502), such that the VCS 1 may determine to associate with the selected nomadic device 53. Upon association of the selected nomadic device 53, the VCS 1 may be configured to perform various actions, such as loading user preferences corresponding to a user associated with the selected nomadic device 53. The user preferences may include, as some examples, telematics unit preferences (e.g., radio presets, preferred sound equalizations, hand-free phone settings), climate control preferences (e.g., preferred heating, cooling, and seat temperature settings), seat preferences (e.g., seat location, lumbar, etc.) and mirror preferences (e.g., orientation, auto-dimming, etc.). For safety purposes, VCS 1 may further be configured to lock out input devices 206 of the selected nomadic device 53 such as a device touch screen.

Figure 6:
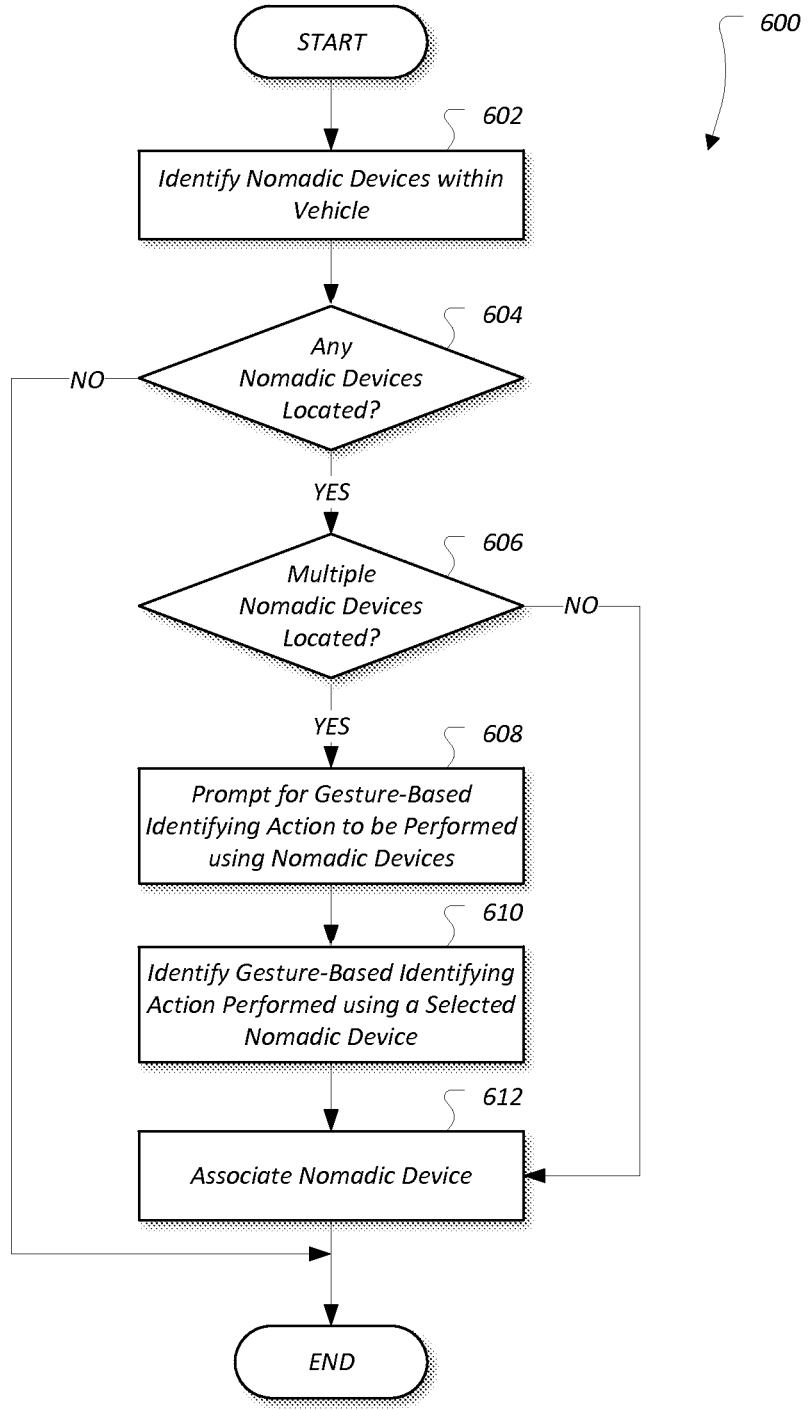
FIG. 6 illustrates an exemplary process for identifying nomadic devices to be associated with the vehicle based computing system as the driver device.

FIG. 6 illustrates an exemplary process 600 for identifying nomadic devices 53 to be associated with the VCS 1 as the driver device 53. The process 600 may be performed, for example, by a CPU 3 of a VCS 1 of a vehicle 31. In other embodiments, the process 600 may be implemented in other controllers, or distributed amongst multiple controllers.

At block 602, the VCS 1 identifies nomadic devices 53. For example, using one or more transceivers 15, the VCS 1 may identify whether multiple nomadic devices 53 are located within the vehicle. The VCS 1 may further filter any identified nomadic devices 53 according to a listing of identifiers of nomadic devices 53 previously associated with the VCS 1, to exclude any nomadic devices 53 that were not previously associated with the VCS 1.

At decision point 604, the VCS 1 determines whether any nomadic devices 53 have been located. For example, if the VCS 1 identifies that no nomadic devices 53 were located, or that no identified nomadic devices 53 were previously been associated with the VCS 1, the process 600 ends. As another possibility, the VCS 1 may prompt the user to associate a new nomadic device 53 with the VCS 1 if nomadic devices 53 were identified but none were previously been associated with the VCS 1 as the driver nomadic device 53. If nomadic devices 53 were located, control passes to decision point 606.

At decision point 606, the VCS 1 determines whether multiple nomadic devices 53 have been located. For example, if the VCS 1 identifies that only one listed nomadic device 53 has entered the vehicle, control passes to block 612 to associate the VCS 1 with the single nomadic device 53. Otherwise, control passes to block 608.

At block 608, the VCS 1 prompts for a gesture-based identifying action to be performed using one of the plurality of nomadic devices 53. For example, as illustrated in FIG. 4, the VCS 1 may display a user interface 300 may including an indication 302 that multiple devices 53 are detected, as well as instructions 304 requesting the user perform a gesture-based identifying action using the one of the multiple potential nomadic devices 53 to be selected for association with the VCS 1 as the driver nomadic device 53. The gesture-based identifying action may include, for example, a request to tap the nomadic device 53 to be paired at designated location within the vehicle. The designated location may include device sensors 208 configured to detect the presence of nomadic devices 53 near the designated location.

At block 610, the VCS 1 identifies that the gesture-based identifying action was performed by one of the nomadic devices 53. For example, the device sensors 208 may detect the presence of one of the nomadic devices 53 within the proximity of the designated location (e.g., the driver's nomadic device 53). The detected nomadic device 53 may accordingly be determined by the VCS 1 to be the nomadic device 53 that should be associated with the VCS 1 as the driver device 53.

At block 612, the VCS 1 associates with the selected nomadic device 53. For example, the VCS 1 may be able to perform certain actions relating to the nomadic device 53, such as loading vehicle user preferences associated with a user of that nomadic device 53 and providing the nomadic device 53 with access to certain features of the VCS 1 such as to provide information on the display 204. Moreover, the nomadic device 53 associated with the VCS 1 may have certain functions locked out when the vehicle is in motion. For example, input using a touch screen input device 206 of the nomadic device 53 may be disabled on the associated nomadic device 53. In some cases, if a nomadic device 53 is already associated with the VCS 1 (e.g., upon an update to the association with the VCS 1), the VCS 1 may be further configured to remove any current associations of the VCS 1 to nomadic devices 53 designated as the driver's before associating with the selected nomadic device 53. After block 612, the process 600 ends.

Variations on the process 600 are possible. For example, the process 600 may begin at block 610, upon the VCS 1 receiving a gesture-based identifying action performed by one of the nomadic devices 53, without prompting the user to perform the gesture-based identifying action. As another example, at decision point 606, if only one listed nomadic device 53 has entered the vehicle, the VCS 1 may further determine that no passengers are present (e.g., utilizing seat occupancy sensors) before passing control to block 612 to associate the VCS 1 with the single nomadic device 53. Thus, if multiple vehicle occupants are present with only a single listed nomadic device 53, the VCS 1 may still pass control to block 608 to confirm (or otherwise request confirmation) that the single nomadic device 53 is actually the driver device 53.

Referring again to FIG. 6, the vehicle 31 and its components illustrated in FIGS. 1-6 are referenced throughout the discussion of the processes 600 to facilitate understanding of various aspects of the present disclosure. The process 600 may be implemented through a computer algorithm, machine executable code, or software instructions programmed into a suitable programmable logic device(s) of the vehicle, such as the vehicle control module, the hybrid control module, another controller in communication with the vehicle computing system, or a combination thereof. Although the various steps shown in the process 600 appear to occur in a chronological sequence, at least some of the steps may occur in a different order, and some steps may be performed concurrently or not at all.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   a display;
   a wireless transceiver configured to detect presence of mobile devices; and
   a controller, configured to
   identify multiple mobile devices within a vehicle using the transceiver;
   prompt, on the display, an action specifying a designated vehicle location to move a mobile device to allow the controller to identify which of the mobile devices is a driver device;
   associate the mobile device moved to the location as the driver device;
   receive a second gesture-based identifying action performed using another device; and
   replace the device associated as the driver device with the another device responsive to the second gesture-based identifying action.

2. The system of claim 1, wherein the action includes one of (i) placing the device within proximity to a device sensor at a designated vehicle location or (ii) tapping the device within proximity to the device sensor at the designated vehicle location.

3. The system of claim 1, wherein the designated vehicle location includes one of (i) a vehicle steering wheel, (ii) a vehicle center console, (iii) a vehicle cup holder, or (iv) a vehicle dash.

4. The system of claim 1, wherein to associate the device includes at least one of to (i) load user preferences corresponding to a user associated with the device, or (ii) lock out an input device of the device.

5. The system of claim 4, wherein the user preferences include at least one of telematics unit preferences, climate control preferences, seat preferences or mirror preferences.

6. The system of claim 1, wherein the display is integrated into a head unit of the vehicle, and the designated vehicle location is a graphical indication on a user interface provided on the display.

7. A method comprising:
prompting, on a vehicle display responsive to a transceiver identifying multiple mobile devices within a vehicle, an action specifying a designated vehicle location to move a mobile device for identifying as a driver device;
associating a device, moved according to the action as determined using a proximity sensor, as the driver device; and
replacing the device with another device, responsive to receiving a second gesture-based identifying action performed using the another device.

8. The method of claim 7, wherein the action includes one of (i) placing the device within proximity to a device sensor at a designated vehicle location or (ii) tapping the device within proximity to the device sensor at the designated vehicle location.

9. The method of claim 7, wherein the designated vehicle location includes one of (i) a vehicle steering wheel, (ii) a vehicle center console, (iii) a vehicle cup holder, or (iv) a vehicle dash.

10. The method of claim 7, wherein associating the device comprises at least one of (i) loading user preferences corresponding to a user associated with the device, or (ii) locking out an input device of the device.

11. The method of claim 10, wherein the user preferences include at least one of telematics unit preferences, climate control preferences, seat preferences or mirror preferences.

12. The method of claim 7, wherein the display is integrated into a head unit of the vehicle, and further comprising displaying the designated vehicle location as a graphical indication on a user interface provided on the display.

13. A non-transitory computer-readable medium comprising instructions for identifying a driver device configured to cause at least one controller to:
identify at least one of (i) a plurality of devices within a vehicle or (ii) a plurality of vehicle occupants within the vehicle;
prompt, on a display of the vehicle, an action specifying a designated vehicle location to move a mobile device to identify the mobile device as the driver device;
identify movement of the device in accordance with the action;
associate the device, moved in accordance with the action, as the driver device;
identify movement of a second mobile device in accordance with the action; and
replace the association of the device as the driver device with an association with the second mobile device as the driver device.

14. The computer-readable medium of claim 13, wherein the action includes one of (i) placing the device within proximity to a device sensor at a designated vehicle location or (ii) tapping the device within proximity to the device sensor at the designated vehicle location.

15. The computer-readable medium of claim 13, wherein the designated vehicle location includes one of (i) a vehicle steering wheel, (ii) a vehicle center console, (iii) a vehicle cup holder, or (iv) a vehicle dash.

16. The computer-readable medium of claim 13, wherein to associate the device includes at least one of to (i) load user preferences corresponding to a user associated with the device, or (ii) lock out an input device of the device.

17. The computer-readable medium of claim 16, wherein the user preferences include at least one of telematics unit preferences, climate control preferences, seat preferences or mirror preferences.

18. The computer-readable medium of claim 13, wherein the display is integrated into a head unit of the vehicle, and the medium further comprises instructions configured to cause the at least one controller to display the designated vehicle location as a graphical indication on a user interface provided on the display.

* * * * *